(12) United States Patent
Chan et al.

(10) Patent No.: US 11,474,892 B2
(45) Date of Patent: Oct. 18, 2022

(54) GRAPH-BASED LOG SEQUENCE ANOMALY DETECTION AND PROBLEM DIAGNOSIS

(71) Applicant: International Business Machines Corporation, Armonk, NY (US)

(72) Inventors: Yuk L. Chan, Rochester, NY (US); Jia Qi Li, Beijing (CN); Zhi Shuai Han, Beijing (CN); Tian Wu, Beijing (CN); Lei Yu, Sleepy Hollow, NY (US); Hong Min, Poughkeepsie, NY (US); Fan Jing Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 17/110,535

(22) Filed: Dec. 3, 2020

(65) Prior Publication Data

US 2022/0179730 A1  Jun. 9, 2022

(51) Int. Cl.
*G06F 11/07* (2006.01)
*G06F 16/901* (2019.01)

(52) U.S. Cl.
CPC ...... *G06F 11/0787* (2013.01); *G06F 16/9024* (2019.01)

(58) Field of Classification Search
CPC .................. G06F 11/0787; G06F 16/9024
See application file for complete search history.

(56) References Cited

U.S. PATENT DOCUMENTS

| 6,349,290 | B1 | 2/2002 | Horowitz et al. |
| 7,506,195 | B2 | 3/2009 | Takahashi et al. |
| 7,742,875 | B2 | 6/2010 | Li et al. |
| 7,856,575 | B2 | 12/2010 | Bock et al. |
| 7,860,815 | B1 | 12/2010 | Tangirala |
| 8,065,336 | B2 | 11/2011 | Armstrong et al. |

(Continued)

FOREIGN PATENT DOCUMENTS

| CN | 101325520 B | 8/2010 |
| CN | 103761173 A | 4/2014 |

(Continued)

OTHER PUBLICATIONS

Chen et al.; "Correlated Anomaly Detection From Large Streaming Data", BigData IEEE International Conference On, pp. 1-11, Dec. 10-13, 2018.

(Continued)

*Primary Examiner* — Matthew M Kim
*Assistant Examiner* — Kyle Emanuele
(74) *Attorney, Agent, or Firm* — Cantor Colburn LLP; Teddi Maranzano

(57) ABSTRACT

Techniques include generating a log sequence for new logs that have been received, searching a log sequence database for the log sequence having been generated, and determining that the log sequence is anomalous in response to not finding an identical log sequence in the log sequence database. In response to the log sequence not being found in the log sequence database, the log sequence is compared to a graph of historical log sequences to find a closest sequence path to one or more historical log sequences. An anomaly of the log sequence is diagnosed based on an occurrence at which the log sequence deviates from the closest sequence path of the one or more historical log sequences.

20 Claims, 11 Drawing Sheets

(56) References Cited

U.S. PATENT DOCUMENTS

| | | |
|---|---|---|
| 8,229,953 B2 | 7/2012 | Kapuram et al. |
| 8,495,429 B2 | 7/2013 | Fu et al. |
| 9,086,944 B2 | 7/2015 | Lentile et al. |
| 9,164,983 B2 | 10/2015 | Liu et al. |
| 9,215,164 B2 | 12/2015 | Scharf et al. |
| 9,225,730 B1 | 12/2015 | Brezinski |
| 9,244,755 B2 | 1/2016 | Huang et al. |
| 9,298,453 B2 | 3/2016 | Vangala et al. |
| 9,354,961 B2 | 5/2016 | Nagura et al. |
| 9,367,809 B2 | 6/2016 | Puri et al. |
| 9,413,837 B2 | 8/2016 | Vaccari et al. |
| 9,633,106 B1 | 4/2017 | Saurabh et al. |
| 9,710,322 B2 | 7/2017 | Jewell et al. |
| 9,734,005 B2 | 8/2017 | Ruan et al. |
| 9,772,898 B2 | 9/2017 | Deshpande et al. |
| 9,811,795 B1 | 11/2017 | Kearns et al. |
| 9,891,983 B1 | 2/2018 | Dechiaro |
| 9,984,060 B2 | 5/2018 | Bhattacharya et al. |
| 9,984,148 B2 | 5/2018 | Lee et al. |
| 10,042,613 B2 | 8/2018 | Castielli et al. |
| 10,042,697 B2 | 8/2018 | Ahad |
| 10,083,073 B2 | 9/2018 | Ambichl et al. |
| 10,120,747 B2 | 11/2018 | Cunico et al. |
| 10,133,568 B2 | 11/2018 | He et al. |
| 10,140,287 B2 | 11/2018 | Dasgupta et al. |
| 10,140,576 B2 | 11/2018 | Eldardiry et al. |
| 10,142,357 B1 | 11/2018 | Tamersoy et al. |
| 10,162,696 B2 | 12/2018 | Kogan-Katz et al. |
| 10,169,731 B2 | 1/2019 | Brew et al. |
| 10,193,533 B2 | 1/2019 | Chen et al. |
| 10,270,668 B1 | 4/2019 | Thompson et al. |
| 10,303,533 B1 | 5/2019 | Panov et al. |
| 10,318,541 B2 | 6/2019 | Bingham et al. |
| 10,339,457 B2 | 7/2019 | Ryckbosch et al. |
| 10,346,229 B2 | 7/2019 | Tee et al. |
| 10,346,758 B2 | 7/2019 | Natsumeda |
| 10,402,255 B1 | 9/2019 | Niyogi |
| 10,467,318 B2 | 11/2019 | Truitt et al. |
| 10,523,520 B2 | 12/2019 | Aggarwal et al. |
| 10,552,289 B2 | 2/2020 | Ilangovan et al. |
| 10,585,774 B2 | 3/2020 | Chen et al. |
| 10,616,038 B2 | 4/2020 | Kushmerick et al. |
| 10,628,747 B2 | 4/2020 | Chen et al. |
| 10,637,745 B2 | 4/2020 | Naous |
| 10,664,535 B1 | 5/2020 | Hahn |
| 10,673,721 B2 | 6/2020 | Hashimoto et al. |
| 10,701,096 B1 | 6/2020 | Johnston et al. |
| 11,347,622 B1 | 5/2022 | Agarwal et al. |
| 2004/0249821 A1 | 12/2004 | Nies et al. |
| 2011/0087924 A1 | 4/2011 | Kandula et al. |
| 2011/0083123 A1 | 5/2011 | Lou et al. |
| 2013/0124923 A1 | 5/2013 | Wang et al. |
| 2014/0365575 A1 | 12/2014 | Spaven et al. |
| 2016/0124823 A1 | 5/2016 | Ruan et al. |
| 2016/0253229 A1 | 9/2016 | Sade et al. |
| 2016/0307285 A1 | 10/2016 | Gallagher |
| 2017/0013003 A1 | 1/2017 | Samuni et al. |
| 2017/0228460 A1 | 8/2017 | Amel et al. |
| 2018/0041500 A1 | 2/2018 | Menahem et al. |
| 2018/0144041 A1 | 5/2018 | Chen et al. |
| 2018/0211197 A1 | 7/2018 | Vosseler et al. |
| 2018/0219723 A1 | 8/2018 | Scarpelli et al. |
| 2018/0308001 A1 | 10/2018 | Doddala et al. |
| 2018/0359530 A1 | 12/2018 | Marlow et al. |
| 2019/0073257 A1 | 3/2019 | Dasgupta et al. |
| 2019/0114244 A1 | 4/2019 | Salunke et al. |
| 2019/0188286 A1 | 6/2019 | Chan et al. |
| 2019/0250970 A1 | 8/2019 | Gupta et al. |
| 2019/0356533 A1 | 11/2019 | Vasseur et al. |
| 2019/0391863 A1 | 12/2019 | Ofer et al. |
| 2020/0076841 A1 | 3/2020 | Hajimirsadeghi et al. |
| 2020/0084085 A1 | 3/2020 | Tucker et al. |
| 2020/0104775 A1 | 4/2020 | Chintalapati et al. |
| 2020/0117668 A1 | 4/2020 | Chamarajnagar |
| 2020/0142954 A1 | 5/2020 | Mandalia et al. |
| 2020/0167350 A1 | 5/2020 | Miller et al. |
| 2020/0201701 A1 | 6/2020 | Wang et al. |
| 2020/0226362 A1 | 7/2020 | Hu et al. |
| 2020/0380408 A1 | 12/2020 | Sridhar et al. |
| 2021/0064500 A1 | 3/2021 | Przestrzelski |
| 2021/0306361 A1 | 9/2021 | Tanaka et al. |
| 2021/0342313 A1 | 11/2021 | Riddell |
| 2021/0382770 A1* | 12/2021 | Lu .................. G06V 30/1988 |

FOREIGN PATENT DOCUMENTS

| | | |
|---|---|---|
| CN | 105577440 B | 6/2019 |
| CN | 106293648 B | 11/2019 |
| CN | 107248927 B | 6/2020 |
| CN | 113434357 A * | 9/2021 |
| EP | 2863309 B1 | 11/2018 |
| KR | 101328328 B1 | 11/2013 |
| WO | 2015168141 A1 | 11/2015 |
| WO | 2017020973 A1 | 2/2017 |
| WO | 2017180666 A1 | 10/2017 |
| WO | WO-2017180666 A1 * | 10/2017 ............ G06F 11/302 |
| WO | 2020023787 A1 | 7/2019 |

OTHER PUBLICATIONS

Du, M. et al., "DeepLog: Anomaly Detection and Diagnosis from System Logs through Deep Learning," Session F2: Insights from Log(in)s CCS'17, Oct. 30-Nov. 3, 2017, Dallas, TX, USA, 14 pages.

Eldardiry et al.; "Multi-Source Fusion For Anomaly Detection: Using across-domain and across-time peer-group consistency checks", JoWUA Journal Of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference On, pp. 1-11, Nov. 2-5, 2016.

Gao et al.; "Modeling Probabilistic Measurement Correlations For . . . Distributed Systems", ICDCS IEEE 29th International Conference On, pp. 623-630, Jun. 22-26, 2009.

Leman Akoglu et al., "Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 15, 2021; 2 pages.

Madireddy et al.; "Analysis And Correlation Of Application I/O Performance And System-Wide I/O Activity", Argonne National Laboratory, pp. 1-12, Apr. 2017.

Peiris et al.; "PAD: Performance Anomaly Detection In Multi-Server Distributed Systems", Cloud IEEE 7th International Conference On, pp. 769-776, Jun. 27-Jul. 2, 2014.

Peng et al.; "CM-GANs: Cross-Modal Generative Adversarial Networks For Common Representation Learning", Cornell University Library, arXiv:1710.05106v2,pp. 1-13,Apr. 26, 2018.

Song, Lei; "Informative Correlation Extraction From And For Forex Market Analysis", Auckland University Of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan.

U.S. Appl. No. 17/110,438, filed Dec. 3,, 2020, Entitled: Correlation-Based Multi-Source Problem Diagnosis, First Named Inventor: Yuk L. Chan.

Yuk L. Chan et al., "Integrating Documentation Knowledge With Log Mining for System Diagnosis," U.S. Appl. No. 17/110,430, filed Dec. 3, 2020.

Yuk L. Chan et al., "Log-Based Status Modeling and Problem Diagnosis for Distributed Applications," U.S. Appl. No. 17/110,513, filed Dec. 3, 2020.

Yuk L. Chan et al., "Message Correlation Extration for Mainframe Operation," U.S. Appl. No. 17/110,431, filed Dec. 3, 2020.

Yuk L. Chan et al., "Message-Based Event Grouping for a Computing Operation ," U.S. Appl. No. 17/110,460, filed Dec. 3, 2020.

Yuk L. Chan et al., "Message-Based Problem Diagnosis and Root Cause Analysis," U.S. Appl. No. 17/110,458; filed Dec. 3, 2020.

(56) References Cited

OTHER PUBLICATIONS

Zhong et al.; "An Improved Correlation-Based Anomaly Detection Approach For Condition Monitoring Data Of Industrial Equipment", ICPHM IEEE Inter. Conf. On, pp. 1-6, Jun. 20-22, 2016.
Metric Pair Log Frequency Correlation—Google Scholar/Patents search—text refined (year: 2022).

* cited by examiner

STRUCTURED LOG

```
"MESSAGE_INDEX": 44729444,
"SYSTEM_NAME": "FMSP1",
"timestamp": "2020-01-25T23:59:39.410000",
"JOB_ID": "STC27693",
"MPF_FLAGS": 90,
"MESSAGE_ID": "DBNA014I",
"MESSAGE_TEXT": "DBNA014I DBNARCHV WAITING FOR WORK: CLASS = RQJV"
```

FIG. 5 256

| Time | JOB_ID | MESSAGE_ID | MESSAGE_TEXT |
|---|---|---|---|
| > Jan 13, 2020 @ 03:19:43.270 | EBPAC TBA | | D A,CMMS |
| > Jan 13, 2020 @ 03:19:43.270 | EBPAC TBA | CNZ4106I | CNZ4106I 03:19:43 DISPLAY ACTIVITY<br>OAS 0000 0003 0000 {<br>L MSN SO A-0020 PER=NO SMC-<br>E<br>NUID=STC27603 USERID=CONSTASK<br>RGP=N/A SRVR=NO QSC=NO<br>BCPNAME=JJAFTOFF ASTP=7DBDAAAD |
| | | | —— FIRST |
| > Jan 13, 2020 @ 03:19:43.750 | EBPAC TBA | | D IPLINFO |
| > Jan 13, 2020 @ 03:19:43.750 | EBPAC TBA | IEE254I | IEE254I 03:19:43 IPLINFO DISPLAY<br>LICENSE = z/OS USED LOADxx IN SY<br>L) IEASYS LIST = (00,P1) (OP) IX<br>S10) CURRENT(09S10) VOLUME(SPYRL1 |
| | | | —— SECOND |
| > Jan 13, 2020 @ 03:19:43.750 | EBPAC TBA | | D M=CPU |
| > Jan 13, 2020 @ 03:19:43.750 | EBPAC TBA | IEE174I | IEE174I 03:19:43 DISPLAY M CORE S1<br>15CM CPU THREAD STATUS 0000 + |
| | | | —— THIRD |

...

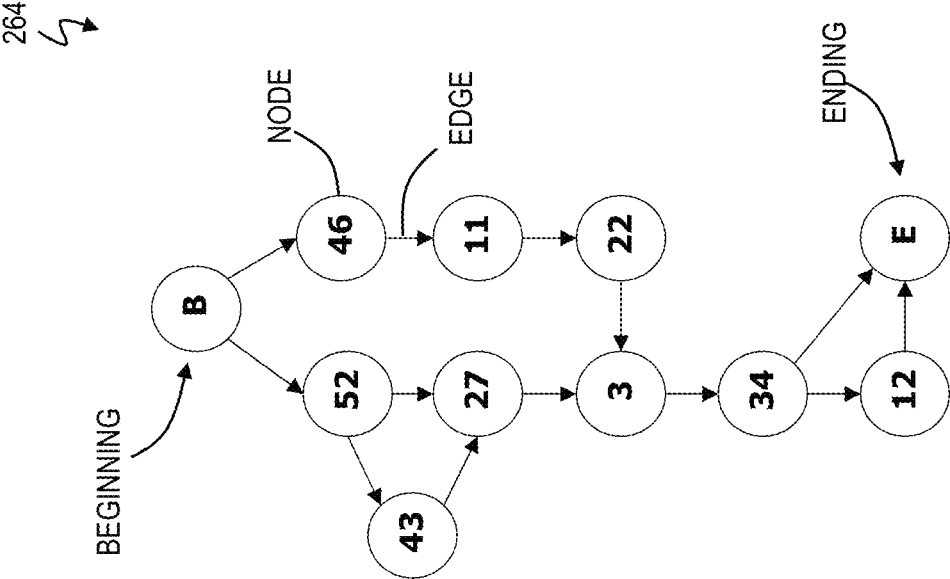

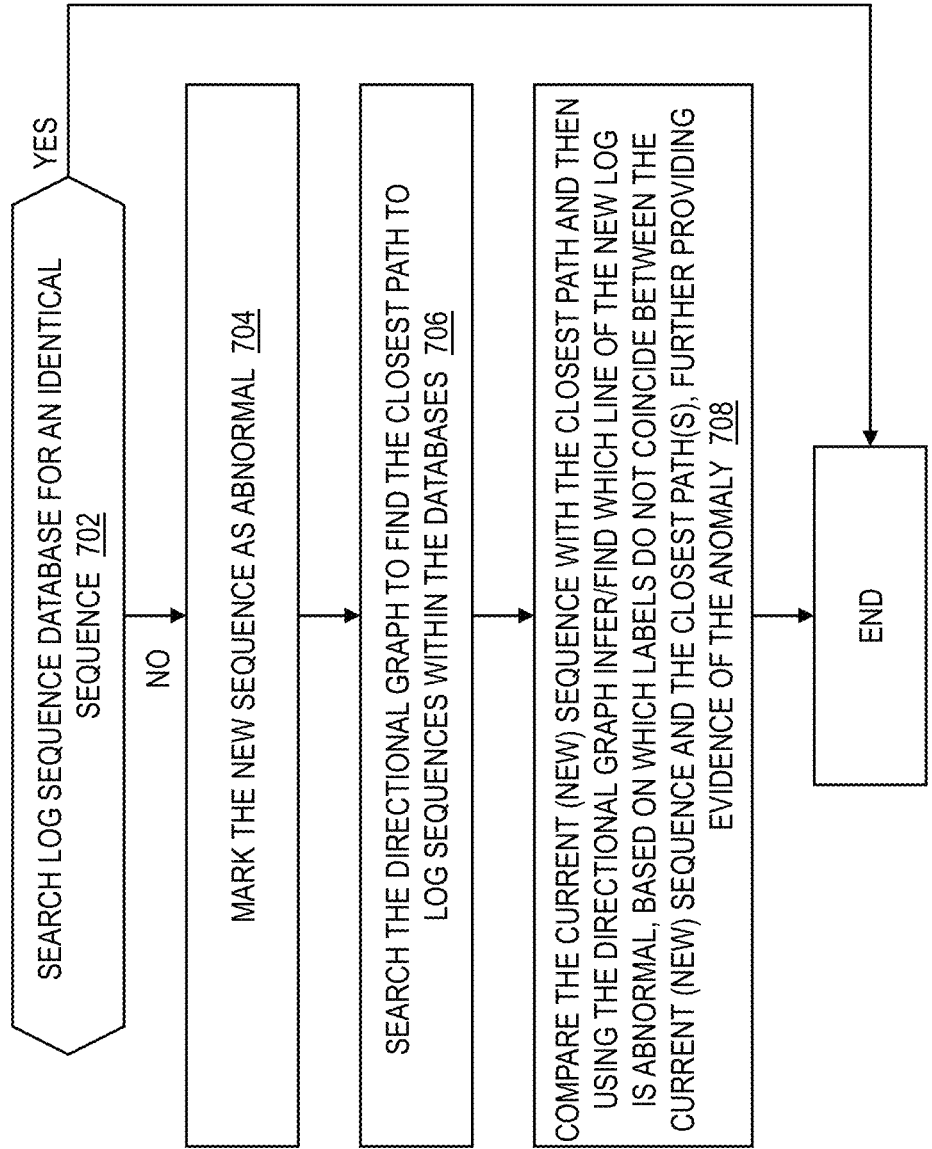

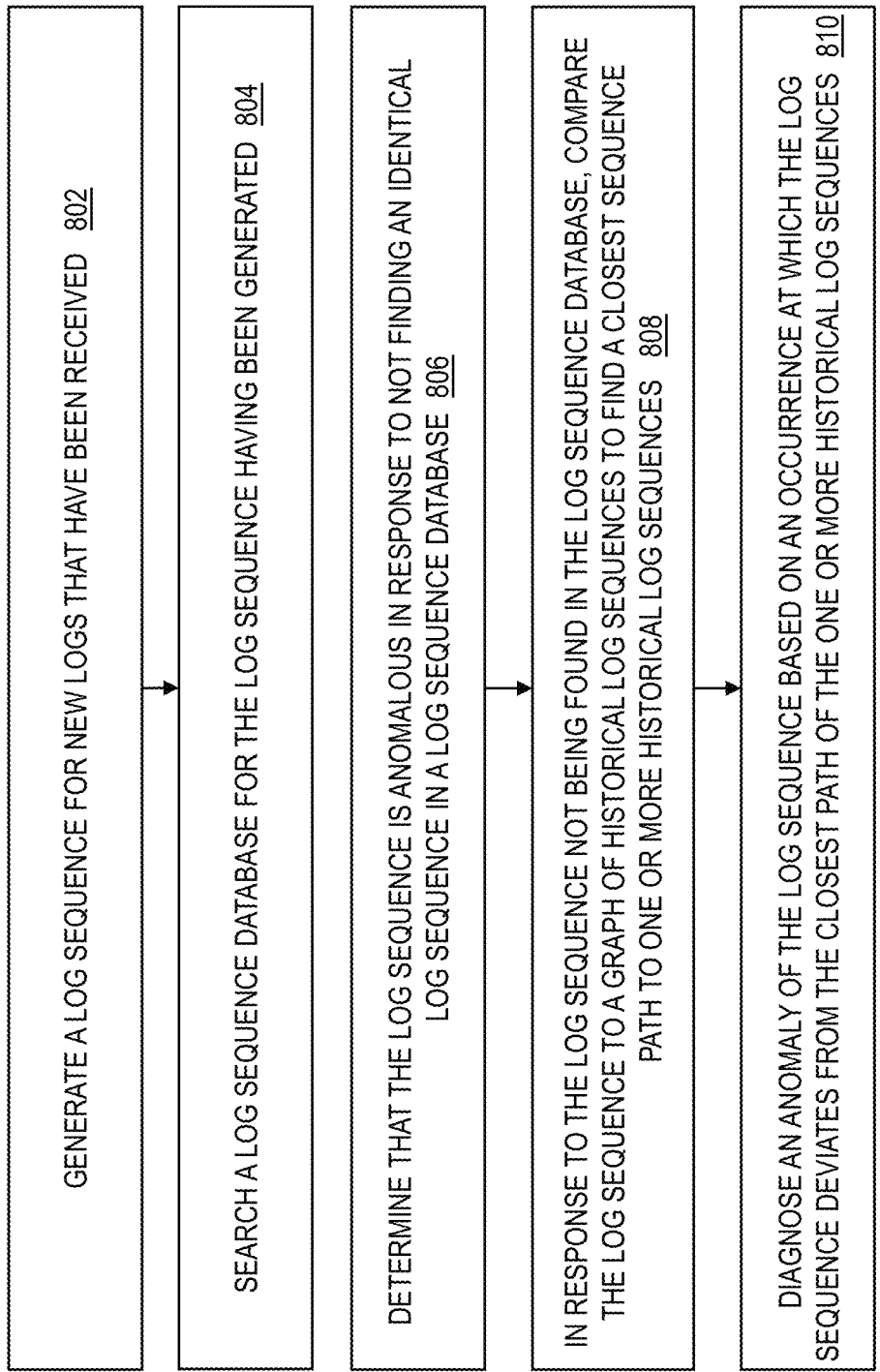

GRAPH-BASED LOG SEQUENCE ANOMALY DETECTION AND PROBLEM DIAGNOSIS

BACKGROUND

The present invention generally relates to computer systems, and more specifically, to computer systems, computer-implemented methods, and computer program products to perform graph-based log sequence anomaly detection and problem diagnosis.

In computing, syslog is a standard for message logging, generally referred to as logs. Syslog allows separation of the software that generates messages, the system that stores the messages, and the software that reports and analyzes the messages. Each message is labeled with a facility code, indicating the software type generating the message, and is assigned a severity level. Computer system designers may use syslog for system management and security auditing as well as general informational, analysis, and debugging messages. A wide variety of devices, such as printers, routers, and message receivers across many platforms use the syslog standard. This permits the consolidation of logging data from different types of systems in a central repository. Implementations of syslog exist for many operating systems.

SUMMARY

Embodiments of the present invention are directed to performing graph-based log sequence anomaly detection and problem diagnosis. A non-limiting example computer-implemented method includes generating a log sequence for new logs that have been received, searching a log sequence database for the log sequence having been generated, and determining that the log sequence is anomalous in response to not finding an identical log sequence in the log sequence database. The computer-implemented method includes in response to the log sequence not being found in the log sequence database, comparing the log sequence to a graph of historical log sequences to find a closest sequence path to one or more historical log sequences. Also, the computer-implemented method includes diagnosing an anomaly of the log sequence based on an occurrence at which the log sequence deviates from the closest sequence path of the one or more historical log sequences.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts an example structured log in accordance with one or more embodiments of the present invention;

FIG. 5 depicts an example log sequence of history logs (or new logs) based on job identification in accordance with one or more embodiments of the present invention;

FIG. 6A depicts an example directional graph in accordance with one or more embodiments of the present invention;

FIG. 7 is a flowchart of performing graph-based anomaly analysis in accordance with one or more embodiments of the present invention;

FIG. 8 is a flowchart of determining and diagnosing one or more anomalies in a new log sequence of new logs using history logs in accordance with one or more embodiments of the present invention;

DETAILED DESCRIPTION

One or more embodiments of the present invention are configured to build a graph based on mainframe syslog sequences, or log sequences. A mainframe log parser is configured to process original text-based raw logs, and a serialization module is used to transform multiple lines of logs into log sequences. A sequence representation learner is used to learn and extract vector representations of the log sequences. A clustering/outlier detection module is configured to remove noisy sequences. A graph generation module is configured to build a log template graph and/or directional graph. One or more embodiments perform graph-based anomaly detection and problem diagnoses with log sequences to detect problems in a mainframe or other computer system.

One or more embodiments address issues related to mainframe logs where mainframe logs consist of highly technical information that can be difficult and time-consuming to interpret, although the mainframe logs offer insights into how to manage an operating system environment such as a z/OS® operating system. Although typical ways to analyze log sequences include log sequence clustering and long short-term memory (LSTM) network (or LSTM prediction), their performance is limited by the quality of clustering and lack of context information for diagnosis. One or more embodiments use machine learning and natural language processing techniques to analyze mainframe logs in order to enable intelligent insights and problem diagnostics, for example, by performing graph-based anomaly detection and problem diagnoses with log sequences.

Figure 1:
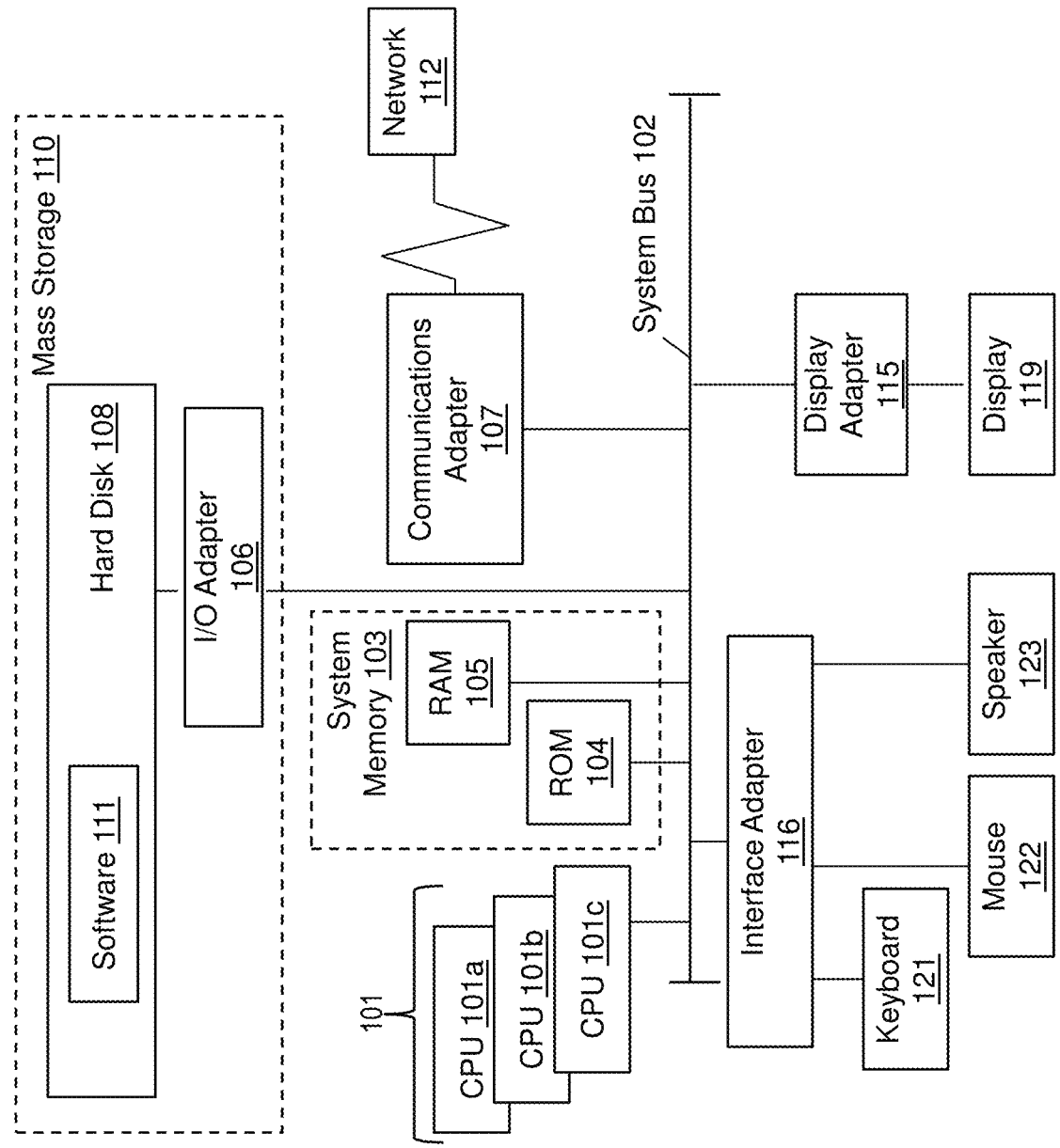
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
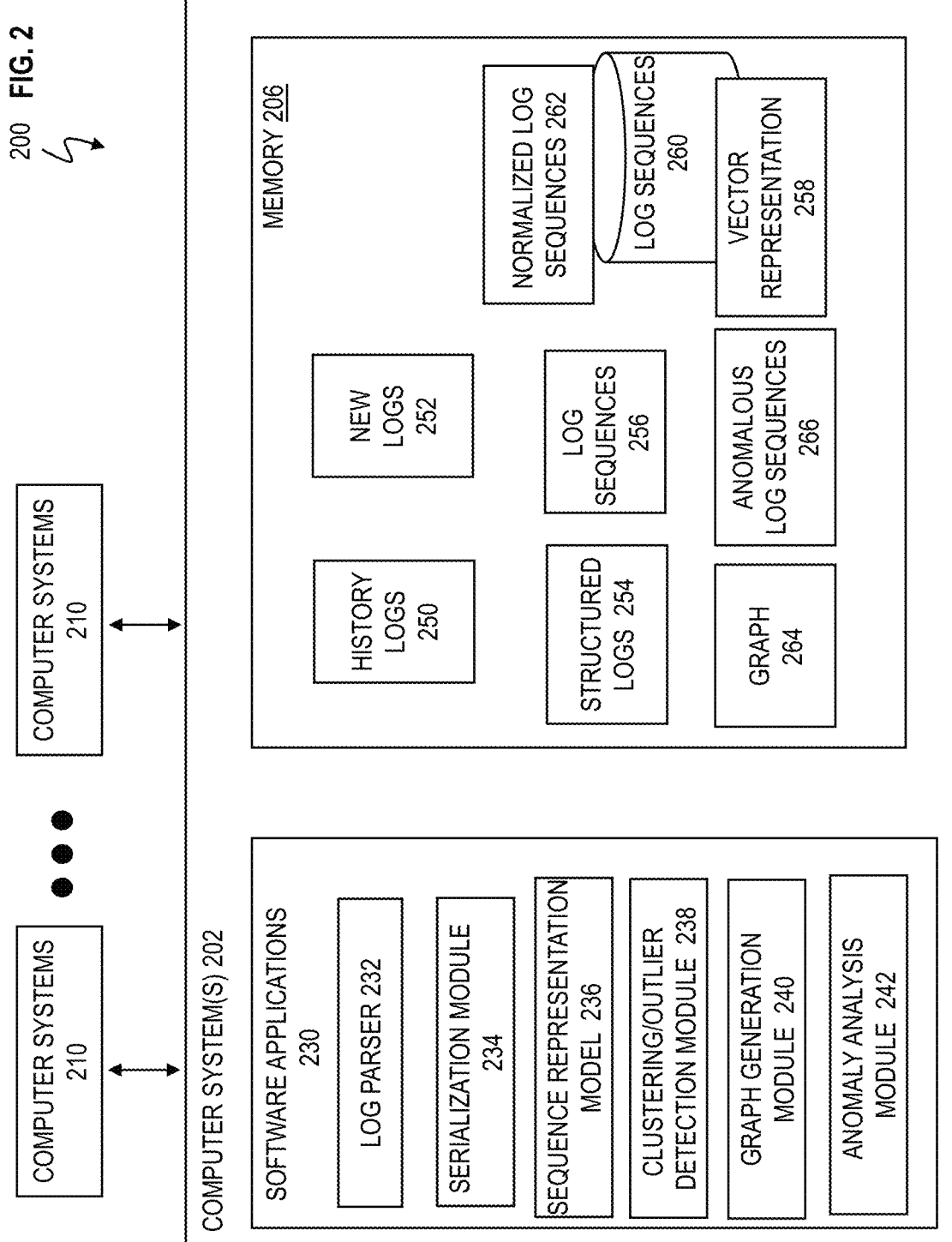
FIG. 2 is a block diagram of a system for building a graph based on mainframe syslog sequences and performing graph-based anomaly detection and problem diagnoses with log sequences in accordance with one or more embodiments of the present invention.

FIG. 2 is a block diagram of a system 200 for building a graph based on mainframe syslog sequences and performing graph-based anomaly detection and problem diagnoses with log sequences in accordance with one or more embodiments of the present invention. FIG. 2 depicts one or more computers systems 202 coupled to one or more computer system 210 via a wired and/or wireless network. For example, computer system 202 can be representative of numerous computers in a datacenter servicing various users, and computer systems 210 can be representative of numerous computers in a datacenter. Elements of computer system 100 may be used in and/or integrated into computer systems 202 and computer systems 210. One or more software applications 230, one or more log parsers 232, one or more serialization modules 234, one or more sequence representation models 236, one or more clustering/outlier detection modules 238, one or more graph generation modules 240, and one or more analysis modules 242 may utilize and/or be implemented as software 111 executed on one or more processors 101, as discussed in FIG. 1.

There are many jobs running on an operating system of computer systems (such as computer systems 210 and even computer system 202), for example, z/OS® system. It is impossible for system programmer to know the ins and outs of each job. If a job failed, the system programmer will need to look through the log messages for a possible root cause; however, being unfamiliar with the job makes this a daunting task. According to one or more embodiments, by applying the graph-based log message analysis as discussed in FIGS. 6A and 6B, a "left-right" or side-by-side comparison of missing and/or extraneous messages to the expected messages can determine and diagnose a problem for a job, thereby quickly providing the system programmer with identification of which messages to focus on.

Figure 3:
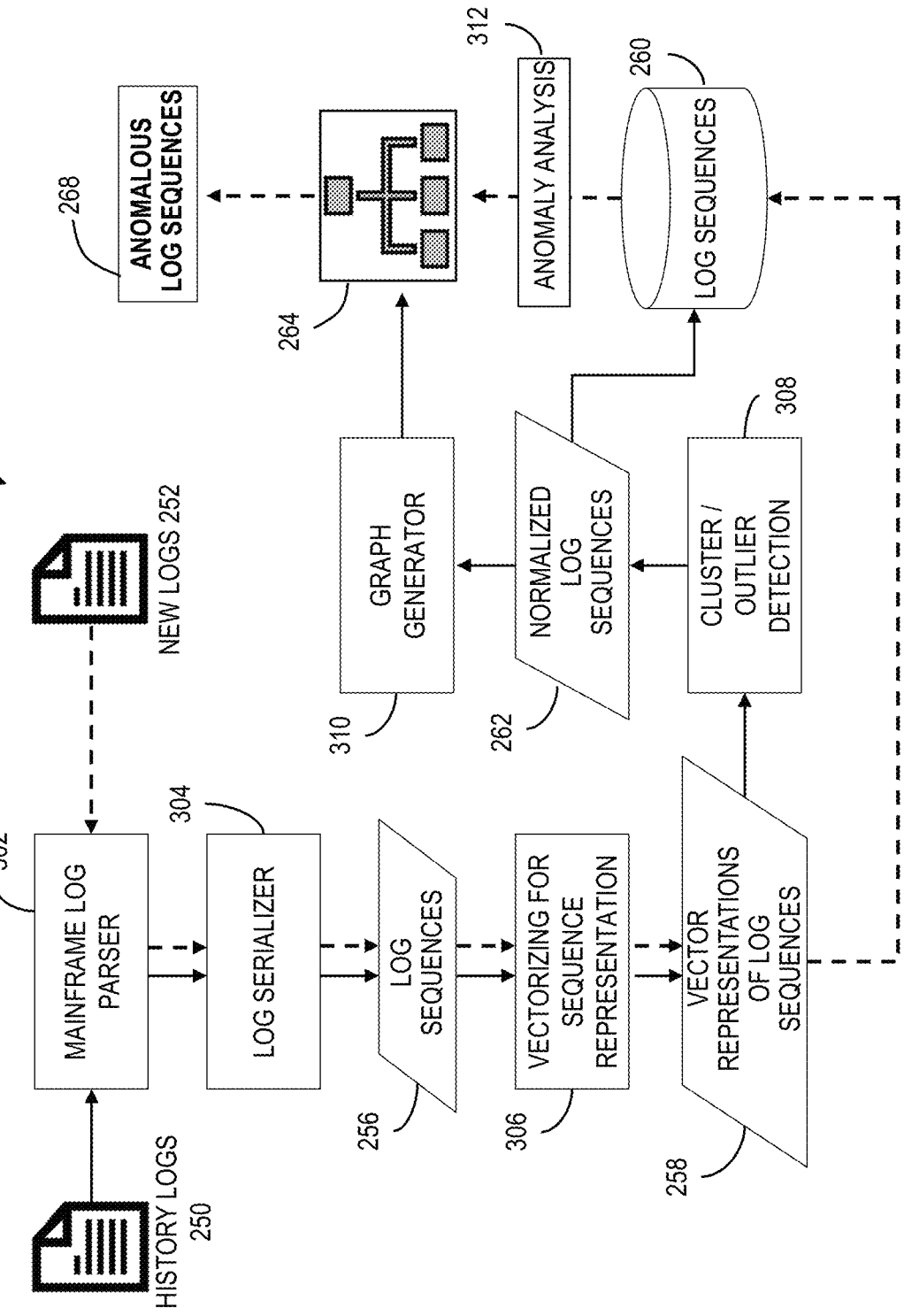
FIG. 3 is a block diagram of an example flowchart for building a graph based on syslog/log sequences and performing graph-based anomaly detection and problem diagnosis in accordance with one or more embodiments of the present invention.

FIG. 3 is a block diagram of an example flowchart 300 for building a graph based on mainframe syslog sequences (e.g., training) and performing graph-based anomaly detection and problem diagnosis with log sequences (e.g., problem detection and diagnosis) in accordance with one or more embodiments of the present invention. The flowchart 300 will be described with reference to FIG. 2. FIG. 3 illustrates analogous details performed for both history logs 250 and new logs 252, and the flow for history logs 250 is denoted with a solid arrow while the flow for new logs 252 is denoted with a dashed arrow. At block 302, software applications 230 of computer system 202 are configured to parse history logs 250. History logs 250 and new logs 252 are the raw text and/or raw textual logs. Log parser 232 of software applications 230 parses the raw textual logs and forms the raw text into a structured format, for example, a structured log 254, which provides dedicated fields for serialization. FIG. 4 depicts an example structured log 254 according to one or more embodiments of the invention. A few example fields of structured log 254 can include Message_Index, System_Name, timestamp/time, Job_Identification (ID), MPF flags, Message_ID, Message_Text, etc. FIG. 4 illustrates an example structured log 254 for a single log or log message. It should be appreciated that each log or log message in history logs 250 and new logs 252 will have its own structured log. Each History logs 250 as well as new logs 252 can include and/or be implemented as syslogs which describe a standard for message logging. History logs 250 and new logs 252 include logs or log messages for jobs performed by a computer system. A job is action performed by a computer system, and a computer system can be tasked to perform various jobs at different times. Example jobs can include a job to backup a server, a job to update an email server, etc. History logs 250 and new logs 252 can be received by computer system 202 from numerous computer systems 210 and/or other computer systems for processing as discussed herein. Some of history logs 250 and new logs 252 may be from computer system 202. History logs 250 and new logs 252 can be mainframe syslogs or logs. One or more of computer system 202 and/or computer systems 210 can be representative of mainframes, servers, etc., for processing numerous jobs. History logs 250 and new logs 252 can each contain hundreds, thousands, and/or millions of pieces of data, also referred to as "big data". As such, the number of jobs being processed and their corresponding history logs and new logs are too numerous to be done/processed/performed in the human mind.

Referring to FIG. 3, at block 304, software applications 230 of computer system 202 are configured to perform log serialization by transforming multiple lines of structured log 254 for the history log 250 into log sequences 256. For example, serialization module 234 is configured to use "JOB_ID" as an identifier to transform multiple lines of structured logs 254 for log messages or logs into log sequences 256. Serialization module 234 is configured to find each log message that has the same Job_ID in the history logs (i.e., an individual log or log message), and each log message having the same Job_ID will belong to the same log sequence according to chronological order. For example, FIG. 5 depicts an example log sequence 256 of logs or log messages having the same Job_ID according to one or more embodiments of the invention. In FIG. 5, the serialized log sequence includes the time, Job_ID which is the same for each of the messages, message ID which uniquely identifies the type of message, message text which is the textual description of the message, etc. As can be seen, the example log sequence is for Job_ID (or job) EB9ACT0A which is identified in the field for the Job_ID such that each log or log message having (e.g., Job_ID EB9ACT0A) is serialized or listed in chronological order (i.e., in sequence) for log sequence 256 as seen in FIG. 5. For example, in the example log sequence 256, FIG. 5 shows a first log message having an earliest time (e.g., earliest data and time), a second log message have the next time, a third log message having a subsequent time, and so forth. If there are two or more log messages with the same date and time, software applications 230 may order the conflicting log messages based on the importance of the Message_ID and/or Message_Text, such that the more important log message is listed first in the log sequence.

At block 306, software applications 230 of computer system 202 are configured to perform vectorization for log sequence 256 in order to transform log sequence 256 into a vectorized representation, for example, such as vector representation 258. In a log or log message, each Message_ID has a predefined meaning and is usually an alphanumeric term. Software applications 230 of computer system 202 are configured to label each Message_ID, on a one-to-one basis, with a unique label that is specific to the Message_ID, such that if the Message_ID happened to be repeated, the label is likewise repeated. In one or more embodiments, the unique label can be a unique message type number, a long short-term memory (LSTM) message ID, etc. One example way is to label each log by its Message_ID and represent the log sequence by a sequence of Message IDs which are now labels, such as in vector representation [12, 6, 33, 4, 17 . . . ], where each label is serialized by time or timestamp from an earliest date and time to the latest date and time. Each unique message type number can be referred to as an LSTM message ID or label and is defined to correspond to and/or identify a different message ID. Log sequences 256 may have different lengths, thereby having different length vector representations 258, which might affect the quality of clustering later. Accordingly, in one or more embodiments, an LSTM based representation learner (e.g., sequence representation model 236 (or learner)) can be employed to convert the log sequence 256 to a fixed length vector representation 258. An LSTM network (learned) can be utilized to train a deep neural network to classify sequence data. The LSTM network receives input sequence data into the deep neural network and makes predictions based on the individual time steps (e.g., times or timestamps) of the sequence data. For example, an LSTM sequence model is built using deep neural network, and the LSTM model is trained with historical log sequences. When the LSTM model is converged, the hidden layer of the LSTM model is used as the output layer to generate the vector representation of log sequences. When a new log sequence is input to the LSTM model, the LSTM model will produce a fixed length vector representation. The length of the vector being generated can be pre-defined by the LSTM model and/or software applications 230, thus a fixed length vector representation can always be ensured.

At block 308, software applications 230 (e.g., using clustering/outlier detection module 24) of computer system 202 are configured to perform cluster/outlier detection for the vector representation 258 of a log sequence 256 resulting in a normalized vector representation 262. Normalized vector representation 262 for its corresponding log sequence 256 is stored in a database 260 for log sequences. In one or more embodiments, the normalized vector representation 262 may be the same as its vector representation 258 prior to performing cluster/outlier detection because no change occurred. In one or more embodiments, block 308 may be optional/omitted and the original vector representation 258 of log sequence 256 can be stored in database 260. The purpose of clustering/outlier detection is to remove outliers from the dataset, in order to build an accurate sequence graph discussed further below. This may be referred to as denoising. Various techniques can be used for clustering/outlier detection such as, for example, density-based techniques (k-nearest neighbor, local outlier factor, isolation forests, etc.), subspace-based, correlation-based, and tensor-based outlier detection, one-class support vector machines, long short-term memory neural networks, Bayesian networks, hidden Markov models (HMMs), cluster analysis-based outlier detection, etc. During clustering/outlier detection, certain sequences (i.e., sequence of message IDs) may be identified as outliers, meaning the sequence is unusual/abnormal out of all historical logs. When building an accurate sequence graph/database, such sequences are to be ignored by software applications 230.

At block 310, software applications 230 of computer system 202 are configured to generate a graph using the sequence of labels/unique message type numbers/LSTM message IDs in vector representation 258 of the log sequence 256. It should be appreciated that there is a vector representation 258 for each job (i.e., each Job_ID), and as such, the graph will contain vector representations 258 for numbers log sequences 256. After denoising, graph generation module 240 can create an example directional graph 264 shown in FIG. 6A. For example, a sequence for one vector representation 258 of the log sequence 256 can be represented as [B, 52, 27, 3, 34, 12, E] in directional graph 264. The flow can be performed for many logs or log message in history logs 250, and as such, there are other sequences corresponding to other vector representations 258 of other log sequences 256 including [B, 52, 27, 3, 34, E], [B, 52, 43, 27, 3, 34, 12, E], [B, 46, 11, 22, 3, 34, 12, E]. Software applications 230 of computer system 202 can insert "B" and "E" in the vector representation for readability where "B" and "E" represent the beginning and ending respectively of a vector representation. Software applications 230 of computer system 202 may generate directional graph 264 such that each node is represented by a label/unique message type number/LSTM message ID of a log message. As previously noted, a label corresponds to a Message_ID for a log or log message, and therefore, the label can identify the log or log message. The weighted edges can be generated by the sequential order of the sequence in vector representation 258, which is in the chronological order of the time/timestamps. In one or more embodiments, the weight of an edge can be the frequency of message pairs of the edge in all sequences or can normalized according to probability.

As noted herein, directional graph 264 can be enlarged to accommodate all of the logs or log messages in history logs 250, while omitting duplicate log sequences. Accordingly, there can be one large directional graph 264 after software applications 230 of computer system 202 processes all of logs or log messages in history logs 250. It should be appreciated that flowchart 300 is repeated until all logs or log messages in history logs 250 have been processed as discussed herein, thereby resulting in one large directional graph 264. In one or more embodiments, the directional graph 264 can be partitioned or separated by the type of job being performed. For example, software applications 230 of computer system 202 may generate a directional graph 264 for database transfers or database migration, a different directional graph 264 for server backup (operations), etc.

In FIG. 3, it was noted that the solid lines denote the flow for processing history logs 250, which is used to generate directional graph 264 as a reference to subsequently process new sequences of new logs 252. The flow for processing new logs 252 is denoted by dashed lines in FIG. 3 and will be discussed. When processing new logs 252, software applications 230 of computer system 202 is configured to perform blocks 302, 304, 306 as previously discussed herein, and these blocks will only be briefly discussed for new logs 252. Returning to block 302, software applications 230 of computer system 202 are configured to parse new logs 252. Log parser 232 of software applications 230 parses the raw textual logs or log messages and forms them into a structured format, for example, structured log 254, which provides dedicated fields for serialization. At block 304, software applications 230 of computer system 202 are configured to perform log serialization by transforming multiple lines of structured log 254 for new logs 252 into log sequences 256, thereby transforming individual log messages of structured log 254 into log sequences 256 (e.g., depicted in FIG. 5). At block 306, software applications 230 of computer system 202 are configured to perform vectorization for log sequence 256 in order to transform log sequence 256 into a vector representation 258 for the new log. For new logs 252, vector representation 258 includes a sequence of unique labels/unique message type numbers/LSTM message IDs which are serialized by time or timestamp from earliest to latest time.

Now turning to new block 312 which is performed for new logs 252 that are being tested for problem detection and diagnosis, software applications 230 of computer system 202 are configured to perform graph-based anomaly analysis (including graph searching) for the new sequence of vector representation 258 of new log. This is identified as the new sequence of vector representation 258 of new logs 252 because the new sequence is to be tested for an anomaly. Any anomaly detected and diagnosed corresponds back to current new logs 252 being processed which is for a particular job, and therefore corresponds and identifies the problem on the computer system (e.g., computer systems 210 and/or 202) for which the job was originally processed. The anomaly could correspond to and identify a problem in hardware components (e.g., processors, memory, caches, registers, I/O connectors, etc.) and/or software components (e.g., software applications, operating systems, protocols, backup software applications, etc.)

Figure 6B:
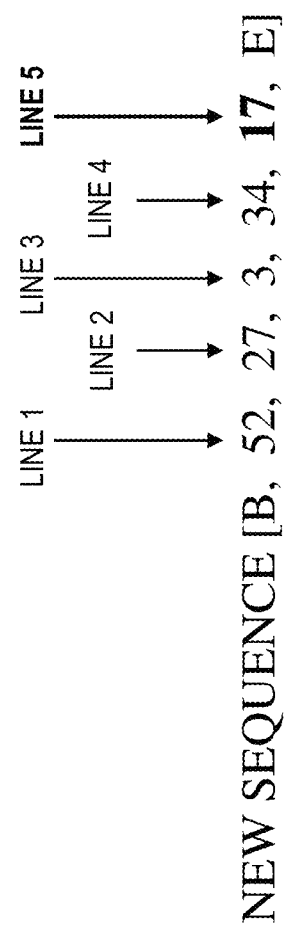
FIG. 6B depicts detection and diagnosis of a new log sequence as an anomaly in accordance with one or more embodiments of the present invention.

Using directional graph 264, software applications 230 of computer system 202 may include and/or utilize an anomaly analysis module 242 to perform graph-based anomaly analysis to determine and diagnose the new sequence of new logs 252 being tested as an anomalous log sequence 268. Further details of performing graph-based anomaly analysis (i.e., block 312) are depicted in flowchart 700 in FIG. 7. At block 702, for a new log sequence of new logs 252 being tested, software applications 230 of computer system 202 are configured to search log sequence database 260 for an identical sequence. For example, using software applications 230, an identical sequence as the new log sequence of vector representation 258 for new logs 252 may be found in database 260. If successful, the new sequence is determined to be normal and the flow ends at block 708. Being normal or a normal log sequence means that the new log sequence of vector representation 258 for new logs 252 matches the steps/actions taken by a previous job performing the same task, because the log messages or logs match as determined by finding matching labels for the identical sequence. At this juncture, the flow ends when the new log sequence of vector representation 258 for new logs 252 is a normal log sequence. Otherwise, software applications 230 of computer system 202 are configured to mark the new sequence as abnormal (i.e., an anomalous log sequence 268) at block 704. At block 706, software applications 230 of computer system 202 are configured to search the directional graph 264 to find the closest sequence path to log sequences within the database 260. At block 708, software applications 230 of computer system 202 are configured to compare the current (new) sequence of vector representation 258 of new logs 252 with the closest sequence path, and then using the directional graph 264, infer/find which line of vector representation 258 of new logs 252 is abnormal, for example, based on which labels do not coincide between the current (new) sequence of vector representation 258 of new logs 252 and the closest sequence path(s), further diagnosing the anomaly. As an example scenario, an example new sequence [B, 52, 27, 3, 34, 17, E] of vector representation 258 of new logs 252 is assumed as depicted in FIG. 6B, where "B" and "E" again represent the beginning and ending of the new sequence. Software applications 230 of computer system 202 search and determine that new sequence [B, 52, 27, 3, 34, 17, E] cannot be found in database 260 of log sequences, and therefore marks/flags (e.g., in memory 206) new sequence [B, 52, 27, 3, 34, 17, E] as an anomaly (i.e., detection) as depicted in FIG. 6B. With reference to the directional graph 264 in FIG. 6A, software applications 230 of computer system 202 search/parse the directional graph 264 and find the closest sequence paths [B, 52, 27, 3, 34, 12, E] and [B, 52, 27, 3, 34, E]. For example, starting at B (i.e., beginning) software applications 230 traverse the directional graph 600 to match the labels (i.e., nodes) with the labels in vector representation 258 of new logs 252 and identifies matches and differences (i.e., missing and/or extraneous messages). As seen in FIG. 6B, software applications 230 of computer system 202 diagnose line 5 of new sequence [B, 52, 27, 3, 34, 17, E] with label/unique message type number/LSTM message ID "17" as the problem and further diagnose/determine that there are two potential candidates "12" and "null" as the correct or missing label, each having a 50% probability of being correct. Accordingly, if the vector representation 258 is a log sequence 256 of new logs 252 for a particular job (e.g., backup job for a database or server), software applications 230 have identified an anomaly with the job and have diagnosed the problem at line "17" which identifies the Message_ID (from the label) for a particular log or log message in new logs 252. Further, software applications 230 provide potential candidates for correcting the job by suggesting label "12" and "null" (i.e., ending).

Technical advantages and benefits include one or more embodiments that generalize log sequence patterns with better quality through clustering and outlier detection based on the learned vector representation of log sequences. Graph-based analysis provide efficient inference while providing explanatory information about the anomalies being detected.

FIG. 8 is a flowchart 800 of determining and diagnosing an anomaly in a new log sequence of the new logs 252 based on history logs 250 (or historical logs) according to one or more embodiments of the invention. At block 802, software applications 230 of computer system 202 are configured to generate a log sequence 256 for new logs 252 that have been received. At block 804, software applications 230 of computer system 202 are configured to search a log sequence database 260 for the generated log sequence 256. At block 806, software applications 230 of computer system 202 are configured to determine that the log sequence 256 for new logs 252 is anomalous in response to not finding an identical log sequence (e.g., a historical log sequence 256 of the history logs 250) in the log sequence database 260. At block 808, software applications 230 of computer system 202 are configured to, in response to the log sequence 256 for new logs 252 not being found in the log sequence database 260, compare the log sequence 256 for new logs 252 to a graph (e.g., directional graph 264) of historical log sequences (e.g., historical log sequences 256 of history logs 250) to find a closest sequence path to one or more historical log sequences. At block 810, software applications 230 of computer system 202 are configured to diagnose an anomaly of the log sequence 256 for new logs 252 based on an occurrence at which the log sequence 256 deviates from the closest sequence path of the one or more historical log sequences.

The log sequence 256 for new logs 252 includes a sequence of labels (also referred to as unique message type numbers and/or LSTM message IDs) corresponding to message identifications (example Message_IDs depicted in FIGS. 4 and 5) of log messages in the new logs 252. The occurrence at which the log sequence 256 of new logs 252 deviates from the closest sequence path identifies a label in the log sequence 256 of new logs. The label having been identified corresponds to a log message in the new logs 252, thereby diagnosing the log message as the anomaly. The occurrence at which the log sequence 256 for the new logs 252 deviates from the closest sequence path identifies one or more nodes in the closest sequence path of the graph not found in an order of labels of the log sequence 256 of new logs 252. The one or more nodes in the closest sequence path of the graph not found in the order of the labels of the log sequence 256 of new logs 252 are candidates for correcting the anomaly. The graph of the historical log sequences 256 of history logs 250 includes nodes connected to one another by edges, each of the nodes corresponding to a label of the historical log sequences 256 of history logs 250, the edges following a sequential order of the historical log sequences 256 of history logs 250.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
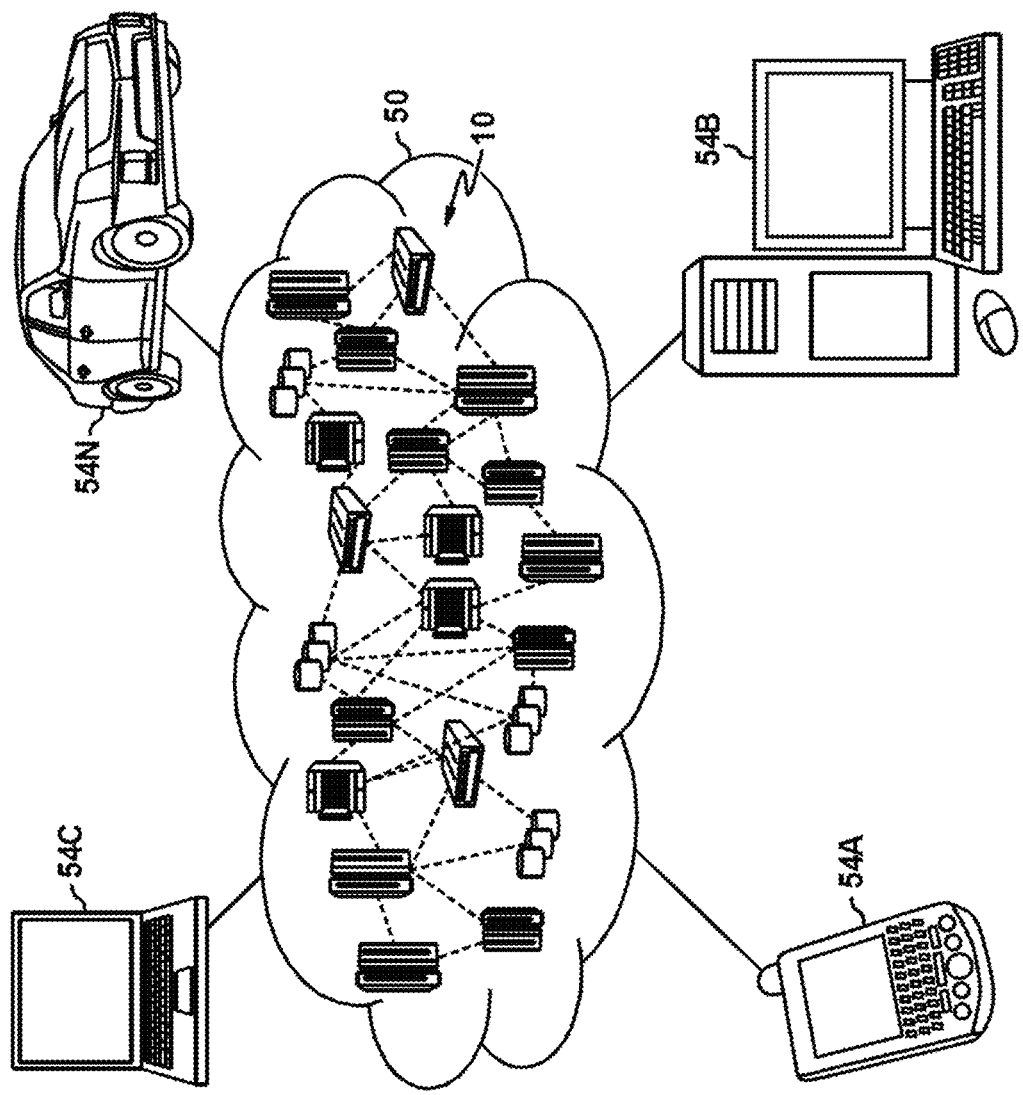
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
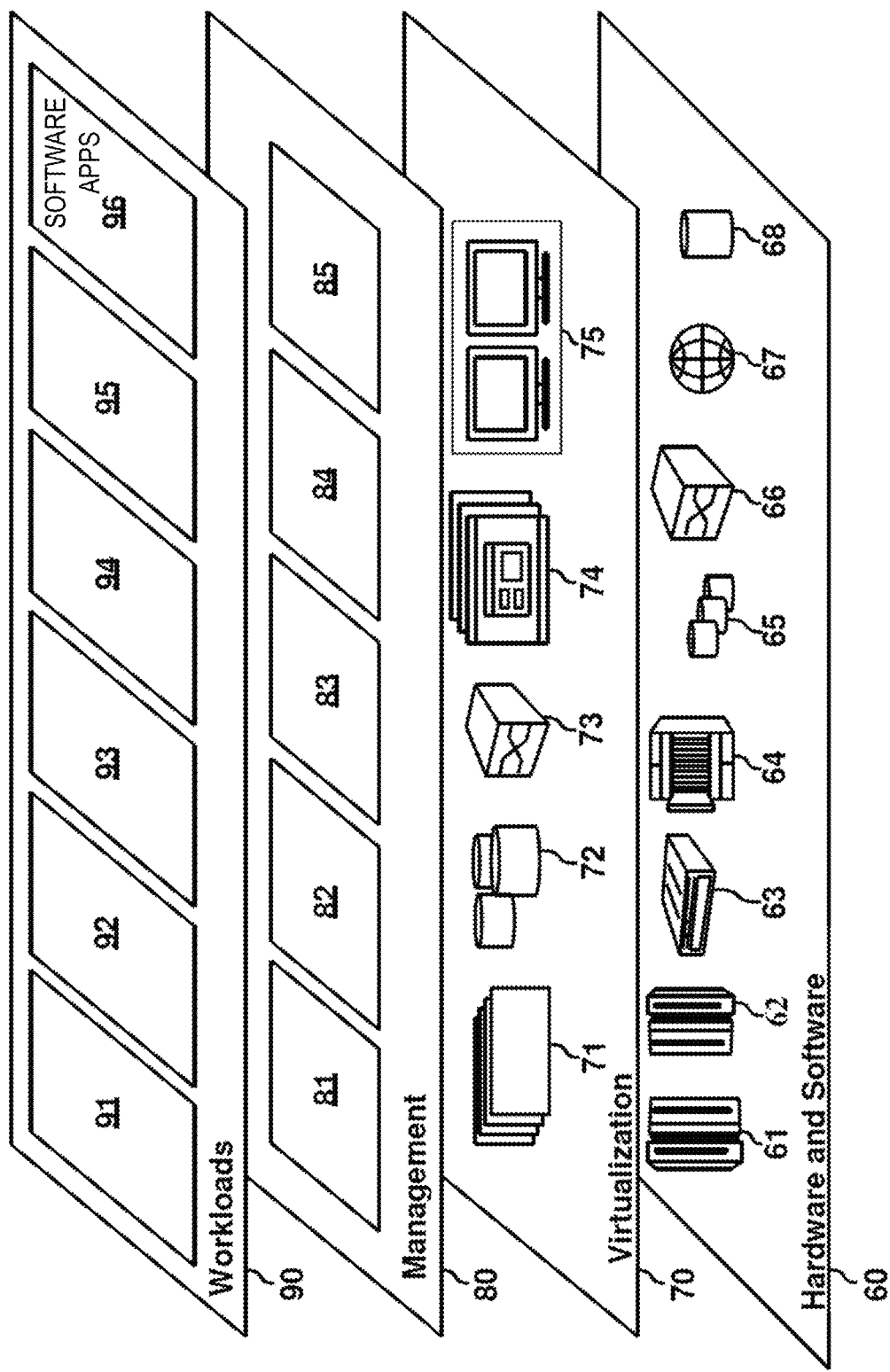
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 230, log parser 232, serialization module 234, sequence representation model 236, clustering/outlier detection module 238, graph generation module 240, anomaly analysis module 242, etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating a log sequence for new logs that have been received;
generating a vector representation of the log sequence, wherein a neural network is used to generate the vector representation, wherein the neural network is trained on historical log sequences to generate vector representations of the historical log sequences;
searching a log sequence database for the vector representation of the log sequence;
determining that the log sequence is anomalous in response to not finding an identical vector representation for a corresponding log sequence in the log sequence database;
in response to the vector representation of the log sequence not being found in the log sequence database, comparing the log sequence to a graph of historical log sequences to find a closest sequence path to one or more historical log sequences; and
diagnosing an anomaly of the log sequence based on an occurrence at which the log sequence deviates from the closest sequence path of the one or more historical log sequences.

2. The computer-implemented method of claim 1, wherein the log sequence comprises a sequence of labels corresponding to message identifications of log messages in the new logs.

3. The computer-implemented method of claim 1, wherein the occurrence at which the log sequence deviates from the closest sequence path identifies a label in the log sequence.

4. The computer-implemented method of claim 3, wherein the label having been identified corresponds to a log message in the new logs, thereby diagnosing the log message as the anomaly.

5. The computer-implemented method of claim 1, wherein the occurrence at which the log sequence deviates from the closest sequence path identifies one or more nodes in the closest sequence path of the graph not found in an order of labels of the log sequence.

6. The computer-implemented method of claim 5, wherein the one or more nodes in the closest sequence path of the graph not found in the order of the labels of the log sequence are candidates for correcting the anomaly.

7. The computer-implemented method of claim 1, wherein the graph of the historical log sequences comprises nodes connected to one another by edges, each of the nodes corresponding to a label of the historical log sequences, the edges following a sequential order of the historical log sequences.

8. A system comprising:
a memory having computer readable instructions; and
one or more processors for executing the computer readable instructions, the computer readable instructions controlling the one or more processors to perform operations comprising:
generating a log sequence for new logs that have been received;
generating a vector representation of the log sequence, wherein a neural network is used to generate the vector representation, wherein the neural network is trained on historical log sequences to generate vector representations of the historical log sequences;
searching a log sequence database for the vector representation of the log sequence;
determining that the log sequence is anomalous in response to not finding an identical vector representation for a corresponding log sequence in the log sequence database;
in response to the vector representation of the log sequence not being found in the log sequence database, comparing the log sequence to a graph of historical log sequences to find a closest sequence path to one or more historical log sequences; and
diagnosing an anomaly of the log sequence based on an occurrence at which the log sequence deviates from the closest sequence path of the one or more historical log sequences.

9. The system of claim 8, wherein the log sequence comprises a sequence of labels corresponding to message identifications of log messages in the new logs.

10. The system of claim 8, wherein the occurrence at which the log sequence deviates from the closest sequence path identifies a label in the log sequence.

11. The system of claim 10, wherein the label having been identified corresponds to a log message in the new logs, thereby diagnosing the log message as the anomaly.

12. The system of claim 8, wherein the occurrence at which the log sequence deviates from the closest sequence path identifies one or more nodes in the closest sequence path of the graph not found in an order of labels of the log sequence.

13. The system of claim 12, wherein the one or more nodes in the closest sequence path of the graph not found in the order of the labels of the log sequence are candidates for correcting the anomaly.

14. The system of claim 8, wherein the graph of the historical log sequences comprises nodes connected to one another by edges, each of the nodes corresponding to a label of the historical log sequences, the edges following a sequential order of the historical log sequences.

15. A computer program product comprising a computer readable storage medium having program instructions embodied therewith, the program instructions executable by a processor to cause the processor to perform operations comprising:
generating a log sequence for new logs that have been received;
generating a vector representation of the log sequence, wherein a neural network is used to generate the vector representation, wherein the neural network is trained on historical log sequences to generate vector representations of the historical log sequences;
searching a log sequence database for the vector representation of the log sequence;

determining that the log sequence is anomalous in response to not finding an identical the vector representation for a corresponding log sequence in the log sequence database;

in response to the vector representation of the log sequence not being found in the log sequence database, comparing the log sequence to a graph of historical log sequences to find a closest sequence path to one or more historical log sequences; and diagnosing an anomaly of the log sequence based on an occurrence at which the log sequence deviates from the closest sequence path of the one or more historical log sequences.

16. The computer program product of claim 15, wherein the log sequence comprises a sequence of labels corresponding to message identifications of log messages in the new logs.

17. The computer program product of claim 15, wherein the occurrence at which the log sequence deviates from the closest sequence path identifies a label in the log sequence.

18. The computer program product of claim 17, wherein the label having been identified corresponds to a log message in the new logs, thereby diagnosing the log message as the anomaly.

19. The computer program product of claim 15, wherein the occurrence at which the log sequence deviates from the closest sequence path identifies one or more nodes in the closest sequence path of the graph not found in an order of labels of the log sequence.

20. The computer program product of claim 19, wherein the one or more nodes in the closest sequence path of the graph not found in the order of the labels of the log sequence are candidates for correcting the anomaly.

* * * * *